(12) United States Patent
Toda et al.

(10) Patent No.: US 7,676,766 B2
(45) Date of Patent: Mar. 9, 2010

(54) GRAPHIC OBJECT DESIGNATING TO EDIT APPARATUS, METHOD, AND COMPUTER READABLE MEDIUM THEREOF

(75) Inventors: Takahiro Toda, Kawasaki (JP); Katsushi Aoki, Kawasaki (JP); Rimi Mizuno, Kawasaki (JP); Eiji Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 983 days.

(21) Appl. No.: 10/888,989

(22) Filed: Jul. 13, 2004

(65) Prior Publication Data
US 2005/0212768 A1 Sep. 29, 2005

(30) Foreign Application Priority Data
Mar. 25, 2004 (JP) ............................. 2004-088779

(51) Int. Cl.
*G06F 3/048* (2006.01)
(52) U.S. Cl. ..................................... 715/857
(58) Field of Classification Search ................ 715/857, 715/858
See application file for complete search history.

(56) References Cited

U.S. PATENT DOCUMENTS

| | | | |
|---|---|---|---|
| 5,510,811 A | | 4/1996 | Tobey et al. |
| 6,133,905 A * | | 10/2000 | Edo et al. .................... 345/156 |
| 6,850,220 B2 * | | 2/2005 | Sakaguchi .................... 345/157 |
| 2002/0075315 A1 * | | 6/2002 | Scott ............................ 345/802 |
| 2003/0083130 A1 | | 5/2003 | Toyoshima |
| 2005/0004917 A1 * | | 1/2005 | Ueda et al. .................. 707/100 |
| 2006/0205506 A1 | | 9/2006 | Toyoshima |

FOREIGN PATENT DOCUMENTS

| | | |
|---|---|---|
| JP | 6-187394 | 7/1994 |
| JP | 08-505718 | 6/1996 |
| JP | 09-081322 | 3/1997 |
| JP | 2001-027924 | 2/2001 |
| JP | 2003-132361 | 5/2003 |
| JP | 2004-000591 | 1/2004 |

OTHER PUBLICATIONS

Notification of Reasons for Refusal Office Action issued Dec. 9, 2008 in the corresponding Japanese Patent Application No. 2004-088779 (2 pages with 2 additional pages of English translation).

* cited by examiner

*Primary Examiner*—Thanh T Vu
(74) *Attorney, Agent, or Firm*—Staas & Halsey LLP

(57) ABSTRACT

A graphic object designating apparatus for designating a graphic object to be edited among graphic objects present in an edit area of a graphics editing system according to the position of a mouse cursor. The apparatus includes an object managing section that manages object information and the mouse cursor position, and a rule storage section in which assignments of key entries for indicating a direction in which the mouse cursor should move and for designating an object directly under the mouse cursor have previously been stored as rules. A trigger processing section generates a mouse cursor moving trigger or an object designating trigger according to the key entries and the rules. An object designating section moves the mouse cursor or designates the object to be edited on the basis of the object information and the triggers. The apparatus allows an operator to designate a desired object easily within the object display screen.

14 Claims, 13 Drawing Sheets

FIG.3

Specific example of description of rule file

```
MOVE_TRIGGER_01                      ⎫ 110
  {
    OBJ_ID = circle_obj ;            ⎫ 111
    METHOD_UP = key_up ;             ⎫
    METHOD_DOWN = key_down ;         ⎬ 112
    METHOD_LEFT = key_left ;         ⎪
    METHOD_RIGHT = key_right         ⎭
  }
MOVE_TRIGGER_02                      ⎫ 120
  {
    OBJ_ID = rect_obj ;              ⎫ 121
    METHOD_UP = shift + key_up ;     ⎫
    METHOD_DOWN = shift + key_down ; ⎬ 122
    METHOD_LEFT = shift + key_left ; ⎪
    METHOD_RIGHT = shift + key_right;⎭
  }

DITECT_TRIGGER = enter ;             ⎫ 130

K_LW_UP_DOWN
  {
    Cx= 2 ;                          ⎫ 140
    Cy= 1 ;                          ⎭
  }
K_LW_LEFT_RIGHT
  {
    Cx= 1 ;                          ⎫ 150
    Cy= 2 ;                          ⎭
  }
```

FIG.4

| Mouse cursor moving trigger | Movement of mouse cursor |
|---|---|
| Up arrow key | Mouse cursor is moved upward onto circular object closest to mouse cursor among circular objects above present mouse cursor position. |
| Down arrow key | Mouse cursor is moved downward onto circular object closest to mouse cursor among circular objects below present mouse cursor position. |
| Right arrow key | Mouse cursor is moved rightward onto circular object closest to mouse cursor among circular objects at right side of present mouse cursor position. |
| Left arrow key | Mouse cursor is moved leftward onto circular object closest to mouse cursor among circular objects at left side of present mouse cursor position. |
| Shift key + Up arrow key | Mouse cursor is moved upward onto rectangular object closest to mouse cursor among rectangular objects above present mouse cursor position. |
| Shift key + Down arrow key | Mouse cursor is moved downward onto rectangular object closest to mouse cursor among rectangular objects below present mouse cursor position. |
| Shift key + Right arrow key | Mouse cursor is moved rightward onto rectangular object closest to mouse cursor among rectangular objects at right side of present mouse cursor position. |
| Shift key + Left arrow key | Mouse cursor is moved leftward onto rectangular object closest to mouse cursor among rectangular objects at left side of present mouse cursor position. |

GRAPHIC OBJECT DESIGNATING TO EDIT APPARATUS, METHOD, AND COMPUTER READABLE MEDIUM THEREOF

BACKGROUND OF THE INVENTION

1. Field of the Invention

The present invention relates to a graphic object designating apparatus, a graphic object designating method and a graphic object designating program for designating graphic objects to be edited on a display screen of a graphics editing system that edits graphic objects by using a GUI (Graphical User Interface).

2. Description of the Related Art

A conventional graphics editing system and graphic object designating apparatus will be described below. The graphics editing system edits a combination of various types of graphic objects. Objects to be edited are displayed on a display screen of the graphics editing system. For example, rectangular objects and circular objects are displayed on the display screen. When performing some processing on objects, first, the operator of the graphics editing system designates objects to be processed by using a graphic object designating apparatus connected to the graphics editing system. When the graphics editing system is informed of the designated objects, the desired processing is executed. For example, the method of designating objects is as follows. The operator moves a mouse to move the mouse cursor onto a desired object and pushes a button provided on the mouse, thereby designating the object that the mouse cursor points to.

Let us explain a graphic object designating operation using a logic circuit designing CAD (Computer Aided Design) system as a specific example of the conventional graphics editing system. In the logic circuit designing CAD system, logic symbols and terminals thereof are displayed on a display screen. Designing of a logic circuit is performed by using a graphic object designating apparatus connected to the logic circuit designing CAD system. That is, a terminal of one logic symbol and a terminal of another logic symbol are designated with a mouse cursor, thereby designating wiring between the terminals.

FIG. 23 is a diagram showing an example of a logic symbol and a mouse cursor. On the display, a large number of logic symbols such as the one 81 shown in FIG. 23 by way of example are displayed, together with a mouse cursor 80, e.g. an arrow. The operator moves the mouse cursor 80 to the position of a desired terminal, e.g. terminal 82, of a desired logic symbol on the display by using a mouse, for example, and pushes a button provided on the mouse in this state to transmit a trigger to the graphic object designating apparatus. Thus, the terminal that the mouse cursor points to is designated. In response to designation made with respect to two terminals in this way, the graphics editing system wires the designated terminals to each other on the display, thereby connecting them together on a net of signal lines.

It should be noted that Japanese Patent Application Unexamined Publication (KOKAI) No. Hei 6-187394 (p. 2-3, FIG. 1) is known as an example of terminal designating apparatus for designating terminals in designing of an LSI logic circuit. According to the terminal designating apparatus, the mouse cursor is moved circularly from one terminal to another of a symbol designated by the operator, thereby facilitating designation of terminals.

However, the object designating method using the mouse cursor involves the following problems. First, when objects displayed on the display screen are small in size, it is difficult for the operator to designate them. For example, in the above-described CAD system for designing an LSI logic circuit, a logic circuit including a large number of logic symbols is displayed on the display screen. Therefore, the display size of each logic symbol is very small, and the display size of each individual terminal is even smaller. The operator may take much time to accurately point the mouse cursor at the position of a desired terminal or may mistakenly designate a terminal adjacent to the desired one. In such a case, the conventional practice is to zoom into a desired area of the display screen to thereby enlarge the display size of logic symbols displayed before designating terminals of the logic symbols. Further, it may necessary to restore the display size to the previous one after designating objects.

When performing an operation in an environment where the mouse cursor is difficult to move freely, it is difficult for the operator to designate objects. For example, when objects are designated by moving the mouse cursor using a touch pad on a notebook-model personal computer, it is difficult to make object designation.

When various types of objects are displayed, it is difficult for the operator to designate desired objects. For example, when three different types of objects, e.g. rectangular objects, circular objects, and linear objects, are displayed, it is difficult to designate only linear objects.

Further, in the above-described terminal designating apparatus, the mouse cursor is moved to all terminals circularly in one direction. Therefore, when a very large number of terminals are present, it takes time and labor to move the mouse cursor to a desired terminal.

SUMMARY OF THE INVENTION

The present invention was made in view of the above-described problems with the prior art.

Accordingly, an object of the present invention is to provide a graphic object designating apparatus, a graphic object designating method and a graphic object designating program that allow the operator to designate a desired object easily within the object display screen.

To attain the above-described object, the present invention provides a graphic object designating apparatus for designating a graphic object to be edited among graphic objects present in an edit area of a graphics editing system according to the position of a mouse cursor. The apparatus includes an object managing section that manages object information including the types and positions of objects present in the edit area and the mouse cursor position, and a rule storage section in which assignments of key entries for indicating a direction in which the mouse cursor should move and for designating an object directly under the mouse cursor have previously been stored as rules. The apparatus further includes a trigger processing section that generates according to the key entries and the rules a mouse cursor moving trigger that instructs movement of the mouse cursor or an object designating trigger that instructs designation of an object directly under the mouse cursor, and an object designating section that moves the mouse cursor on the basis of the object information and the mouse cursor moving trigger, or designates the object to be edited on the basis of the object information and the object designating trigger.

Preferably, in the graphic object designating apparatus according to the present invention, types of objects to which the mouse cursor should move have also previously been assigned to the key entries in the rules. The trigger processing section allows the mouse cursor moving trigger to include a direction in which the mouse cursor should move and a type of an object to which the mouse cursor should move. The object designating section restricts the type of an object to be a candidate for a destination of the mouse cursor according to the mouse cursor moving trigger.

Preferably, the graphic object designating apparatus according to the present invention further includes a rule input section that inputs a file containing the rules written in a predetermined format.

Preferably, the graphic object designating apparatus according to the present invention is arranged as follows. When the mouse cursor moving trigger is generated, the object designating section calculates an evaluation function based on the position of the mouse cursor and the position of each of objects selected as candidates for a destination of the mouse cursor, and moves the mouse cursor to an object having the smallest value of the evaluation function among the candidate objects.

Preferably, the graphic object designating apparatus according to the present invention is arranged as follows. Assuming that the position of the mouse cursor is (Mx, My), and the position of each candidate object is (Ox, Oy), and further, weight coefficients are Cx and Cy, the evaluation function is given by $|Mx-Ox|\times Cx+|My-Oy|\times Cy$. When the mouse cursor moving trigger instructs movement in a vertical direction, a set of weight coefficients for a vertical direction previously defined as being Cx>Cy are used as the weight coefficients. When the mouse cursor moving trigger instructs movement in a horizontal direction, a set of weight coefficients for a horizontal direction previously defined as being Cx<Cy are used as the weight coefficients.

Preferably, in the graphic object designating apparatus according to the present invention, the rules include the set of weight coefficients for a vertical direction and the set of weight coefficients for a horizontal direction.

Preferably, in the graphic object designating apparatus according to the present invention, the object designating section moves the display range of a display screen when the mouse cursor moving trigger is generated and an object to be a candidate for a destination of the mouse cursor is outside the display screen.

Preferably, the graphic object designating apparatus according to the present invention is arranged as follows. When the mouse cursor moving trigger is generated and there is no object to be a candidate for a destination of the mouse cursor in a direction indicated by the mouse cursor moving trigger, the object designating section judges that the mouse cursor is at the opposite side of the edit area, and makes a search for an object to be a candidate for a destination of the mouse cursor again.

In addition, the present invention provides a graphic object designating method for designating a graphic object to be edited among graphic objects present in an edit area of a graphics editing system according to the position of a mouse cursor. The method includes the step of managing object information including the types and positions of objects present in the edit area and the mouse cursor position, and the step of previously storing as rules assignments of key entries for indicating a direction in which the mouse cursor should move and for designating an object directly under the mouse cursor. The method further includes the step of generating according to the key entries and the rules a mouse cursor moving trigger that instructs movement of the mouse cursor or an object designating trigger that instructs designation of an object directly under the mouse cursor, and the step of moving the mouse cursor on the basis of the object information and the mouse cursor moving trigger, or designating the object to be edited on the basis of the object information and the object designating trigger.

In addition, the present invention provides a graphic object designating program stored in a computer-readable storage medium to instruct a computer to execute a graphic object designating method for designating a graphic object to be edited among graphic objects present in an edit area of a graphics editing system according to the position of a mouse cursor. The program instructs the computer to execute the step of managing object information including the types and positions of objects present in the edit area and the mouse cursor position, and the step of previously storing as rules assignments of key entries for indicating a direction in which the mouse cursor should move and for designating an object directly under the mouse cursor. The program further instructs the computer to execute the step of generating according to the key entries and the rules a mouse cursor moving trigger that instructs movement of the mouse cursor or an object designating trigger that instructs designation of an object directly under the mouse cursor, and the step of moving the mouse cursor on the basis of the object information and the mouse cursor moving trigger, or designating the object to be edited on the basis of the object information and the object designating trigger. It should be noted that examples of the above-described computer-readable storage medium include portable storage mediums, e.g. CD-ROMs, flexible disks, DVD disks, optical magnetic disks, and IC cards, databases retaining computer programs, other computers, and databases thereof.

According to the present invention, even when an object displayed on the display screen is small in size or a large number of objects are present in the display screen at a high density, the operator can accurately designate a desired object by a key-in operation. Even when various types of objects are present in the display screen, the operator can accurately designate a desired object by restricting the type of objects to which the mouse cursor is movable through a key-in operation. Even when performing a graphics editing operation on a device where the mouse cursor is difficult to move accurately, such as a touch pad of a notebook-model personal computer, the operator can designate a desired object accurately because the editing can be performed by a key-in operation. In addition, because types of triggers and methods of generating triggers are described in the form of a rule file, various types of objects can be designated.

Further, because the operator can designate a desired object accurately, the display size of objects can be reduced. Consequently, the amount of information that can be obtained from one screen can be increased to a considerable extent without degrading the operability. In addition, because the operator can designate a desired object accurately, the efficiency of the graphics editing operation increases, and hence the time required for the operation can be reduced.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 3 is a diagram showing examples of descriptions in a rule file.

FIG. 4 is a table showing an example of the movement of a mouse cursor for each mouse cursor moving trigger.

DETAILED DESCRIPTION OF THE PREFERRED EMBODIMENTS

Embodiments of the present invention will be described below with reference to the accompanying drawings.

Figure 1:
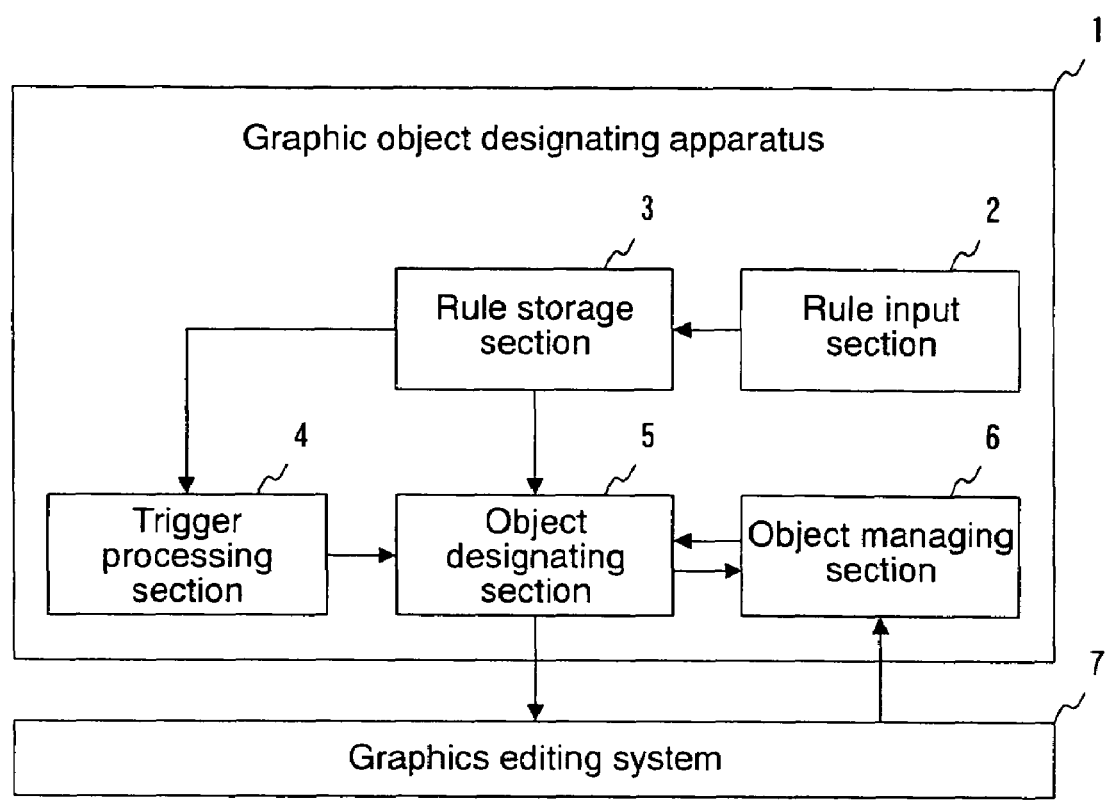
FIG. 1 is a block diagram showing an example of the arrangement of a graphic object designating apparatus according to an embodiment of the present invention.

First, the arrangement of a graphic object designating apparatus according to an embodiment of the present invention will be described. FIG. 1 is a block diagram showing an example of the arrangement of the graphic object designating apparatus according to the embodiment. As shown in FIG. 1, the graphic object designating apparatus 1 includes a rule input section 2, a rule storage section 3, a trigger processing section 4, an object designating section 5, and an object managing section 6. In addition, a graphics editing system 7 that edits graphics by using a GUI is present outside the graphic object designating apparatus 1. In the graphics editing system 7, a part or the whole of an edit area containing objects is displayed as a display screen. When the graphics editing system 7 is a CAD system for designing an LSI logic circuit, for example, the edit area is a substrate, and the objects are logic symbols, terminals, nets, etc.

Figure 2:
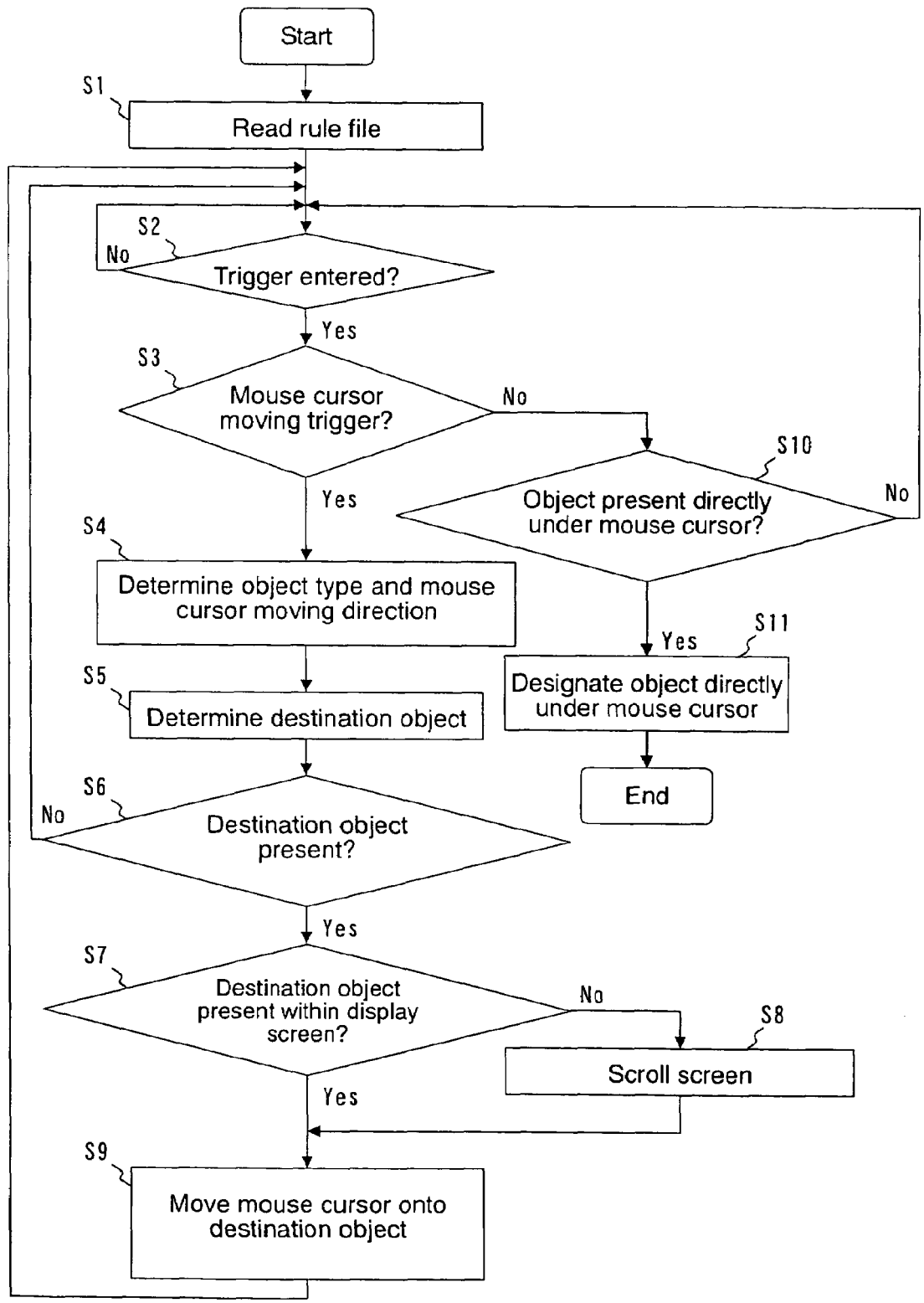
FIG. 2 is a flowchart showing an example of the processing flow executed by the graphic object designating apparatus according to the embodiment of the present invention.

Next, the operation of the graphic object designating apparatus according to the embodiment will be described. FIG. 2 is a flowchart showing an example of the processing flow executed by the graphic object designating apparatus according to the embodiment.

First, the trigger processing section 4 reads a rule file from the rule storage section 3 (S1). The rule file is a file in which rules concerning triggers have been written. The rule file has previously been input to the rule storage section 3 from the rule input section 2. Triggers are generated in response to key-in operations performed by an operator and divided into a mouse cursor moving trigger and an object designating trigger. The mouse cursor moving trigger designates to which object on the edit area the mouse cursor should move, and is defined for each object type. The object designating trigger designates an object to be processed according to the position of the mouse cursor. An example of the description of the rule file will be explained later.

Next, the trigger processing section 4 judges whether or not there has been entry of a key assigned as a trigger in the rule file (S2). If there is no entry of a trigger (if "No" at S2), the process returns to the processing step S2. If a trigger has been entered (if "Yes" at S2), the trigger processing section 4 judges whether or not the trigger is a mouse cursor moving trigger according to the rule file (S3). If the trigger is a mouse cursor moving trigger (if "Yes" at S3), the trigger processing section 4 outputs the type of an object to which the mouse cursor should move and the direction in which the mouse cursor should move to the object designating section 5 as a mouse cursor moving trigger according to the rule file (S4).

Next, the object designating section 5 determines a destination object, which is an object to which the mouse cursor should move, from the mouse cursor moving trigger obtained from the trigger processing section 4 and the positional relationship between the mouse cursor position and each object, which is obtained from the object managing section 6 (S5). Then, the process proceeds to processing step S6. The object managing section 6 manages object information indicating the types and positions of objects present in the edit area and the mouse cursor position. The method of determining a destination object will be explained later.

Next, the object designating section 5 judges whether or not the relevant destination object is present in the object information (S6). If the destination object is not present in the object information (if "No" at S6), the process returns to the processing step S2. If the destination object is present in the object information (if "Yes" at S6), the process proceeds to processing step S7.

Next, the object designating section 5 judges whether or not the destination object is present within the present display screen (S7). If the destination object is present within the present display screen (if "Yes" at S7), the object designating section 5 moves the mouse cursor onto the destination object (S9). Then, the process returns to the processing step S2. If the destination object is not present within the present display screen (if "No" at S7), the object designating section 5 executes screen scrolling (S8). Then, the process proceeds to processing step S9.

If the trigger is an object designating trigger (if "No" at S3), the trigger processing section 4 outputs the object designating trigger to the object designating section 5. The object designating section 5 judges whether or not an object is present directly under the mouse cursor from the object designating trigger and the positional relationship between the mouse cursor position and each object (S10). If an object is not present directly under the mouse cursor (if "No" at S10), the process returns to the processing step S2. If an object is present directly under the mouse cursor (if "Yes" at S10), the object designating section 5 designates the object directly under the mouse cursor and outputs it to the graphics editing system 7 (S11). Then, this flow is terminated.

Next, examples of descriptions in the rule file will be explained. FIG. 3 is a diagram showing specific rule file description examples. FIG. 3 shows an example in which mouse cursor moving triggers are written with respect to two types of objects, i.e. circular objects, and rectangular objects. Although in the example circular objects and rectangular objects are used as objects for explanatory purposes, if the graphic object designating apparatus according to the present invention is used to design an LSI logic circuit, it is possible to use logic symbol objects, terminal objects, net objects, etc. as objects.

In FIG. 3, description 110 declares a mouse cursor moving trigger for a first object. Description 111 states that the type of the first object is a circular object. Description 112 shows methods of generating mouse cursor moving triggers for the first object, in which: "key_up" is assigned as an instruction to move the mouse cursor upward; "key_down" is assigned as an instruction to move the mouse cursor downward; "key_left" is assigned as an instruction to move the mouse cursor leftward; and "key_right" is assigned as an instruction to move the mouse cursor rightward. Here, "key_up" represents the Up arrow key among the direction keys on the keyboard; "key_down" represents the Down arrow key; "key_left" represents the Left arrow key; and "key_right" represents the Right arrow key. Description 120 declares a mouse cursor moving trigger for a second object. Description 121 states that the type of the second object is a rectangular object. Description 122 shows methods of generating mouse cursor moving triggers for the second object, in which: "shift+key_up" is assigned as an instruction to move the mouse cursor upward; "shift+key_down" is assigned as an instruction to move the mouse cursor downward; "shift+key_left" is assigned as an instruction to move the mouse cursor leftward; and "shift+key_right" is assigned as an instruction to move the mouse cursor rightward. Here, "shift" represents a Shift key among the keys on the keyboard. Description 130 states that the method of generating an object designating trigger is the depression of the Enter key. Description 140 shows a set of weight coefficients for the vertical direction. Description 150 shows a set of weight coefficient for the horizontal direction. The weight coefficients for the vertical and horizontal directions will be explained later.

FIG. 4 is a table showing an example of the movement of the mouse cursor for each mouse cursor moving trigger. FIG. 4 shows the movement of the mouse cursor that takes place in response to the entry of each key defined as a mouse cursor moving trigger in the example of the rule file in FIG. 3. For example, if the Shift key plus the Up arrow key is depressed, the mouse cursor is moved upward onto a rectangular object closest to the mouse cursor among rectangular objects above the present mouse cursor position.

Next, the method of determining a destination object at step S5 will be explained. Objects of the type indicated by the mouse cursor moving trigger that are present within the edit area in the direction indicated by the mouse cursor moving trigger relative to the mouse cursor are defined as candidate objects. Here, a weighted distance is calculated for each of the candidate objects. If the direction indicated by the mouse cursor moving trigger is up or down, a weighted distance is calculated by using a set of weight coefficients for the vertical direction. If the direction indicated by the mouse cursor moving trigger is left or right, a weighted distance is calculated by using a set of weight coefficients for the horizontal direction. Among the candidate objects, an object having the smallest weighted distance is determined to be a destination object.

Figure 5:
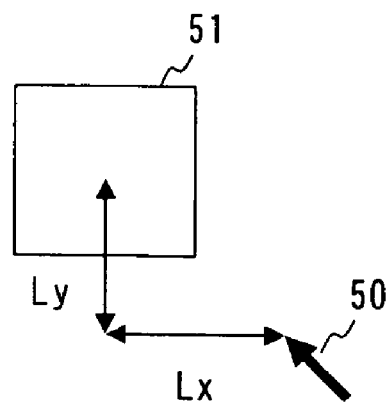
FIG. 5 is a diagram showing an example of the positional relationship between an object and the mouse cursor.

Let us explain the weighted distance. FIG. 5 is a diagram showing an example of the positional relationship between an object and the mouse cursor. Assuming that the coordinates of the mouse cursor 50 are (Mx, My) and the center coordinates of the object 51 are (Ox, Oy), the horizontal distance Lx and the vertical distance Ly between the mouse cursor and the object are defined by the following equations (1) and (2), respectively:

$$Lx = |Mx - Ox| \qquad (1)$$

$$Ly = |My - Oy| \qquad (2)$$

The weighted distance Lw between the mouse cursor 50 and the object 51 is defined by the following equation (3):

$$Lw = Lx \times Cx + Ly \times Cy \qquad (3)$$

Here, the horizontal weight coefficient Cx and the vertical weight coefficient Cy are coefficients that are selected according to the direction of a mouse cursor moving trigger chosen by the operator, and are read from the rule file. When Cx=1 and Cy=1 are selected, in particular, Lw is equal to the Manhattan distance.

Figure 6:
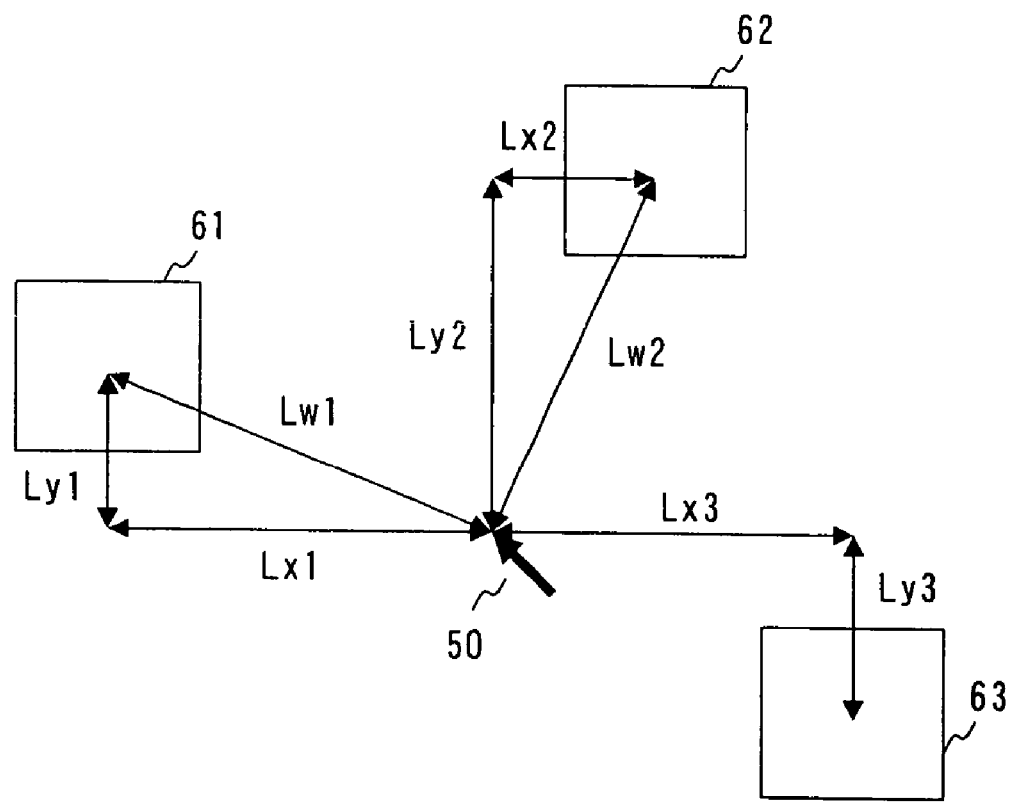
FIG. 6 is a diagram showing an example of the positional relationship between a plurality of objects and the mouse cursor.

FIG. 6 is a diagram showing an example of the positional relationship between a plurality of objects and the mouse cursor. Lx and Ly of objects 61, 62 and 63 are shown with respect to the mouse cursor 50. Here, it is assumed that Lx1=10, Ly1=5, Lx2=5, Ly2=10, Lx3=8, and Ly3=6.

Let us assume that the Up arrow key is entered as a mouse cursor moving trigger. The objects 61 and 62, which are present above the mouse cursor, are defined as candidate objects, and the weighted distances Lw1 and Lw2 are calculated for the candidate objects 61 and 62. In this case, the Manhattan distances of the objects 61 and 62 with respect to the mouse cursor are equal to each other, i.e. 10+5=15. It is generally assumed that the operator wishes the mouse cursor to move onto the object 62. Therefore, Cx=2 and Cy=1 are given as a set of weight coefficients for the vertical direction to calculate Lw1 and Lw2.

$$Lw1 = Lx1 \times Cx + Ly1 \times Cy$$
$$= 10 \times 2 + 5 \times 1$$
$$= 25$$

$$Lw2 = Lx2 \times Cx + Ly2 \times Cy$$
$$= 5 \times 2 + 10 \times 1$$
$$= 20$$

Hence, Lw1>Lw2. Thus, the object 62, which has the smallest Lw among the candidate objects is determined to be a destination object.

If the operator depresses the Up or Down arrow key to move the mouse cursor onto a desired object, a set of weight coefficients for the vertical direction in which Cx is set larger than Cy are given. If the operator depresses the Left or Right arrow key, a set of weight coefficients for the horizontal direction in which Cy is set larger than Cx are given. The values of the weight coefficients for the vertical and horizontal directions are written in the rule file. Although this embodiment employs an algorithm that uses Lw to determine a destination object, it is possible to use another algorithm for selection of an object in the vicinity of the mouse cursor.

Next, a specific example of the mouse cursor movement in response to a mouse cursor moving trigger will be shown. In this example, the rule file shown in FIG. 3 is used.

Figure 7:
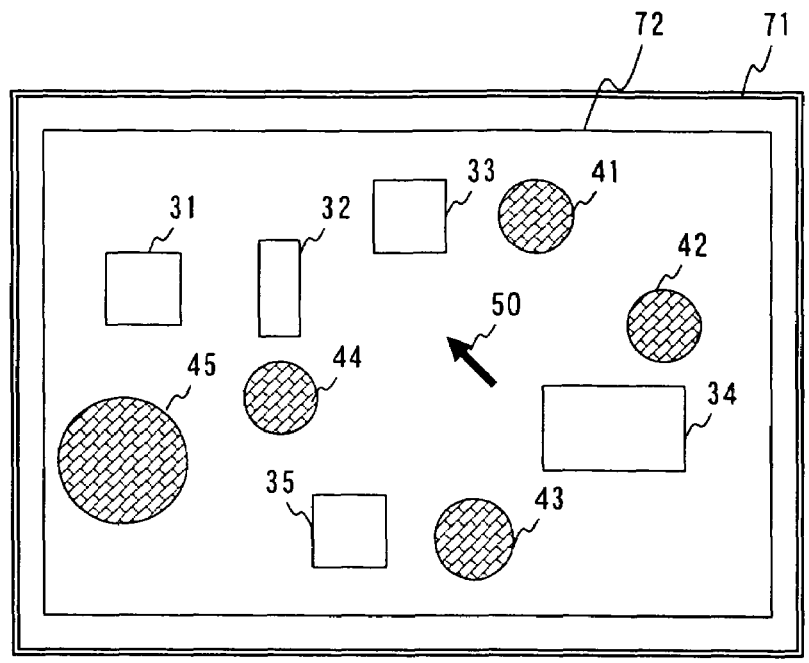
FIG. 7 is a diagram showing an example of the initial state of a normal mouse cursor movement.

First, specific examples of normal mouse cursor movement will be shown. FIG. 7 is a diagram showing an example of the initial state of a normal mouse cursor movement. As shown in FIG. 7, on the display screen 72 are displayed the whole edit area 71, together with rectangular objects 31 to 35 and circular objects 41 to 45 arranged on the edit area 71, and the mouse cursor 50.

Figure 8:
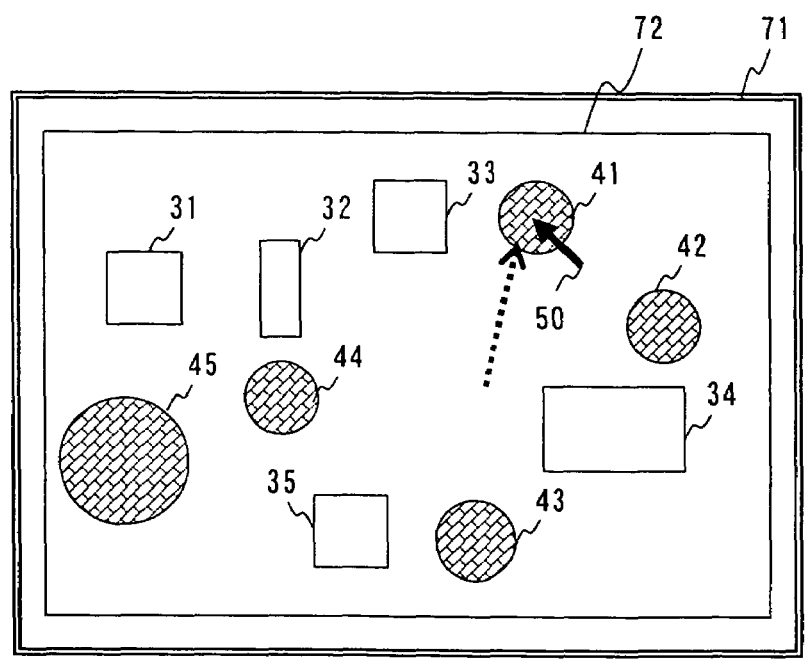
FIG. 8 is a diagram showing a first example of mouse cursor movement from the state shown in FIG. 7.

If the Up arrow key is entered as a mouse cursor moving trigger in the state shown in FIG. 7, the mouse cursor 50 moves onto the circular object 41, as shown in FIG. 8. In FIG. 8 and subsequent figures, the starting position of the dotted-line arrow indicates the position of the mouse cursor before movement thereof, and the terminating position of the dotted-line arrow indicates the position of the mouse cursor after the movement.

Figure 9:
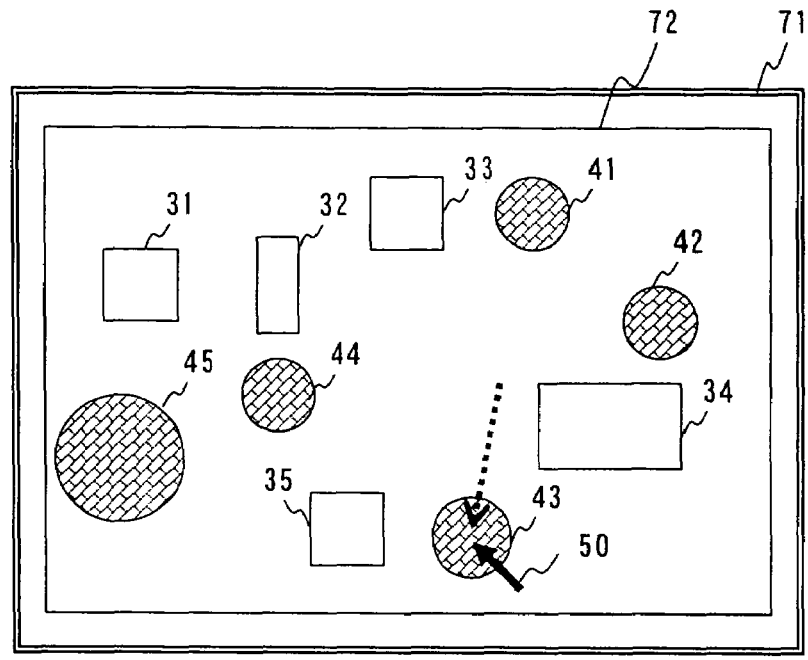
FIG. 9 is a diagram showing a second example of mouse cursor movement from the state shown in FIG. 7.

If the Down arrow key is entered as a mouse cursor moving trigger in the state shown in FIG. 7, the mouse cursor 50 moves onto the circular object 43, as shown in FIG. 9.

Figure 10:
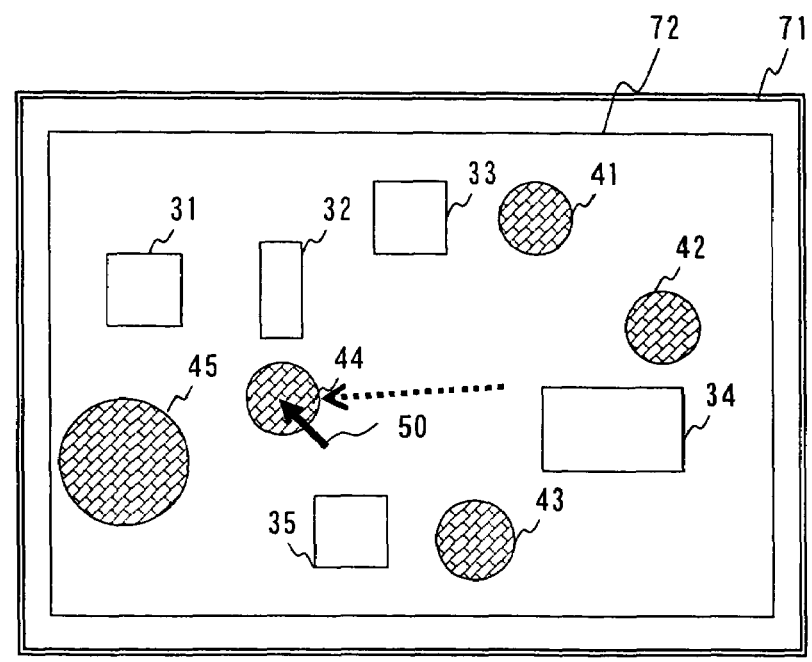
FIG. 10 is a diagram showing a third example of mouse cursor movement from the state shown in FIG. 7.

If the Left arrow key is entered as a mouse cursor moving trigger in the state shown in FIG. 7, the mouse cursor 50 moves onto the circular object 44, as shown in FIG. 10.

Figure 11:
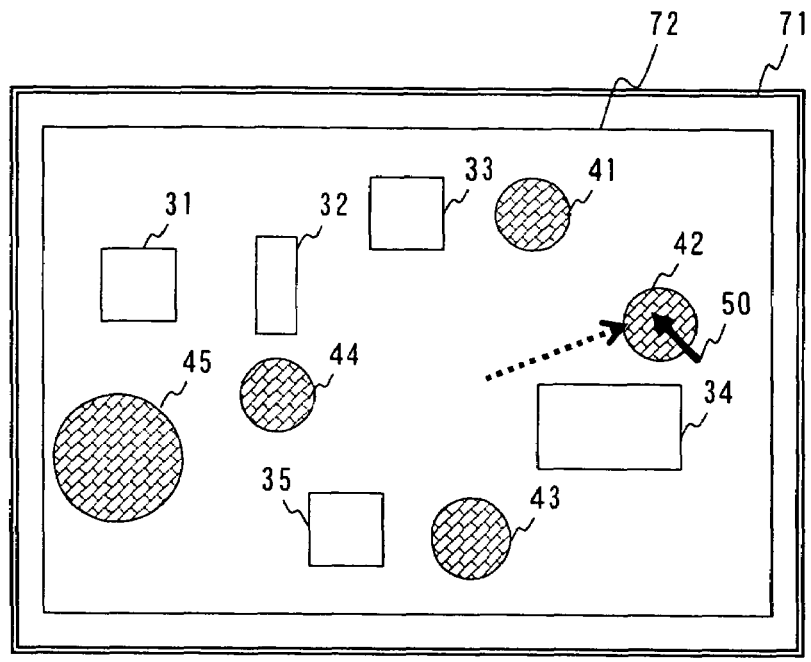
FIG. 11 is a diagram showing a fourth example of mouse cursor movement from the state shown in FIG. 7.

If the Right arrow key is entered as a mouse cursor moving trigger in the state shown in FIG. 7, the mouse cursor 50 moves onto the circular object 42, as shown in FIG. 11.

Figure 12:
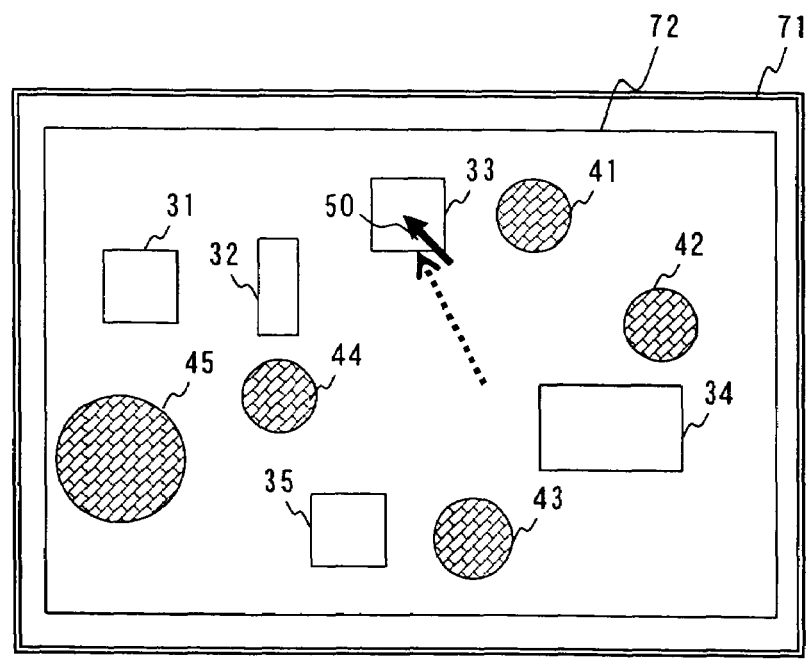
FIG. 12 is a diagram showing a fifth example of mouse cursor movement from the state shown in FIG. 7.

If the Shift key plus the Up arrow key is entered as a mouse cursor moving trigger in the state shown in FIG. 7, the mouse cursor 50 moves onto the rectangular object 33, as shown in FIG. 12.

Figure 13:
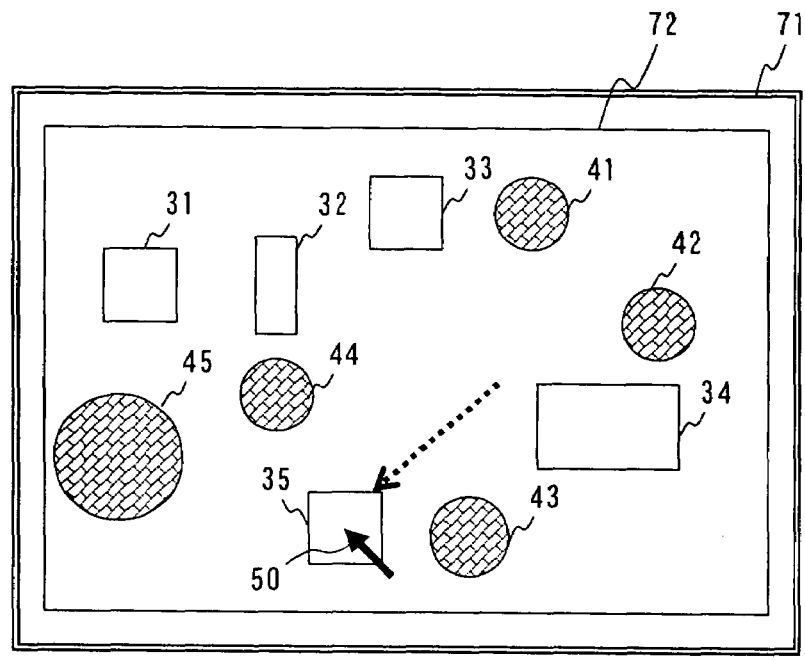
FIG. 13 is a diagram showing a sixth example of mouse cursor movement from the state shown in FIG. 7.

If the Shift key plus the Down arrow key is entered as a mouse cursor moving trigger in the state shown in FIG. 7, the mouse cursor 50 moves onto the rectangular object 35, as shown in FIG. 13.

Figure 14:
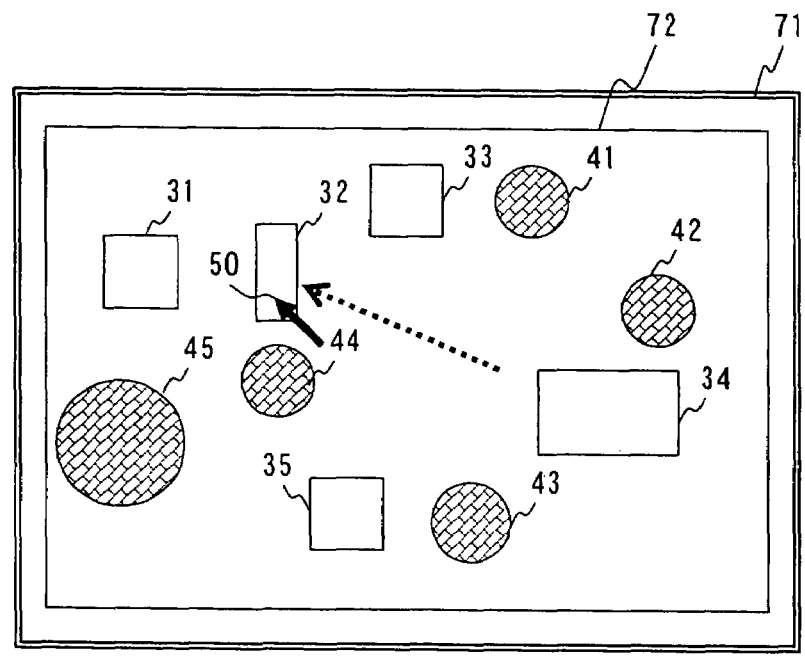
FIG. 14 is a diagram showing a seventh example of mouse cursor movement from the state shown in FIG. 7.

If the Shift key plus the Left arrow key is entered as a mouse cursor moving trigger in the state shown in FIG. 7, the mouse cursor 50 moves onto the rectangular object 32, as shown in FIG. 14.

Figure 15:
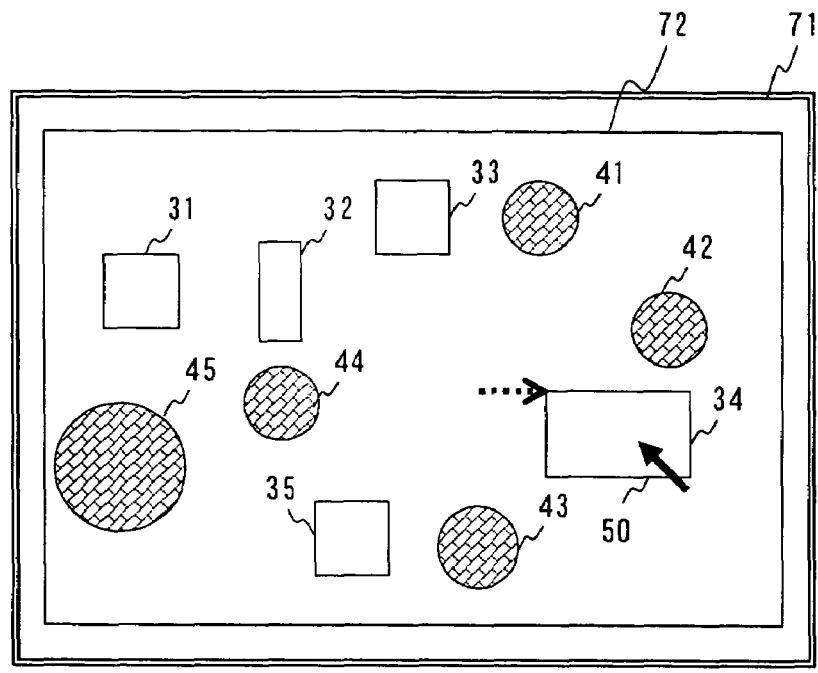
FIG. 15 is a diagram showing an eighth example of mouse cursor movement from the state shown in FIG. 7.

If the Shift key plus the Right arrow key is entered as a mouse cursor moving trigger in the state shown in FIG. 7, the mouse cursor 50 moves onto the rectangular object 34, as shown in FIG. 15.

Figure 16:
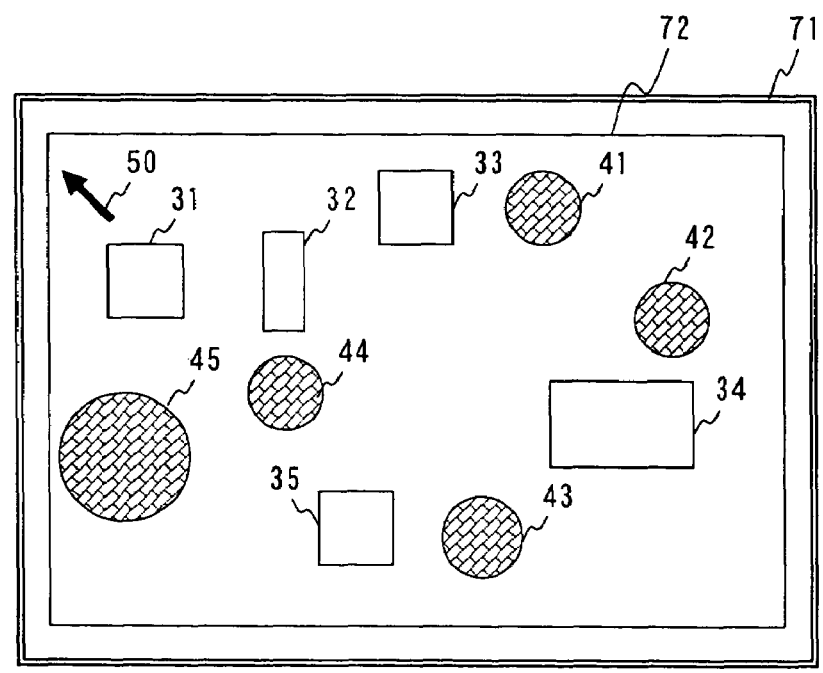
FIG. 16 is a diagram showing an example of the initial state of a mouse cursor movement in which the type of objects to which the mouse cursor is movable is restricted.

Next, specific examples of mouse cursor movement to only a restricted type of objects will be shown. FIG. 16 is a diagram showing an example of the initial state of a mouse cursor movement in which the type of objects to which the mouse cursor is movable is restricted. FIG. 16 is the same as FIG. 7 except the position of the mouse cursor 50.

Figure 17:
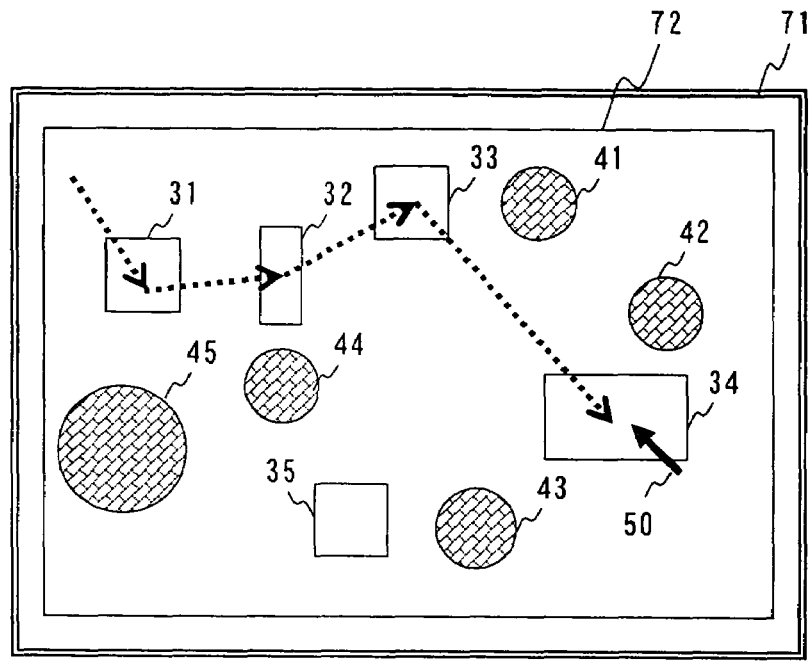
FIG. 17 is a diagram showing a first example of mouse cursor movement from the state shown in FIG. 16.

If the operator wishes the mouse cursor 50 to move onto the rectangular object 34 in the state shown in FIG. 16, he or she enters the Shift key plus the Right arrow key four times as a mouse cursor moving trigger. Consequently, as shown in FIG. 17, the mouse cursor 50 moves to the rectangular objects 31, 32, 33 and 34 successively. Because the mouse cursor 50 moves only to rectangular objects successively in this way, the mouse cursor movement can be made efficient.

Figure 18:
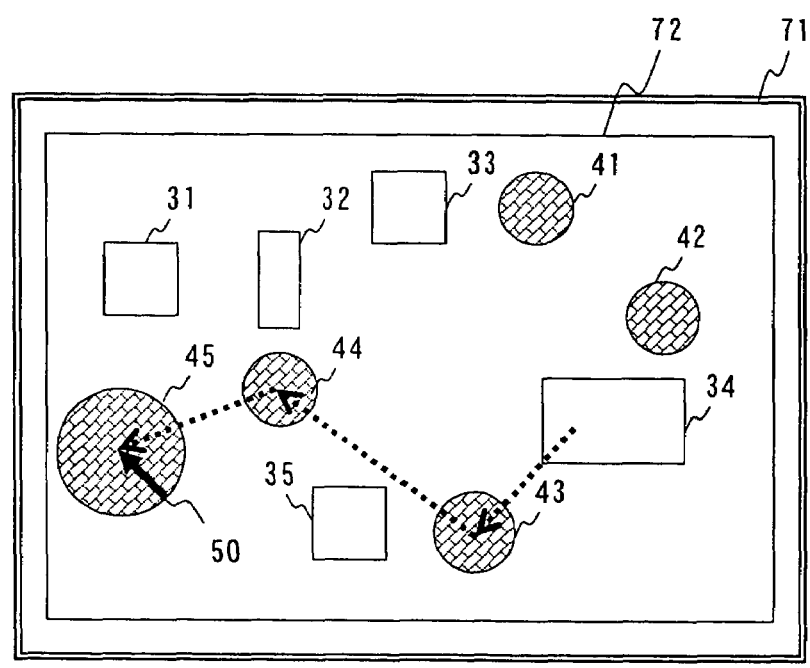
FIG. 18 is a diagram showing a second example of mouse cursor movement from the state shown in FIG. 16.

If the operator wishes the mouse cursor 50 to move from the rectangular object 34 onto the circular object 45 in the state shown in FIG. 17, he or she enters the Left arrow key three times as a mouse cursor moving trigger. Consequently, as shown in FIG. 18, the mouse cursor 50 moves to the circular objects 43, 44 and 45 successively. Because the mouse cursor 50 moves only to circular objects successively in this way, the mouse cursor movement can be made efficient.

Figure 19:
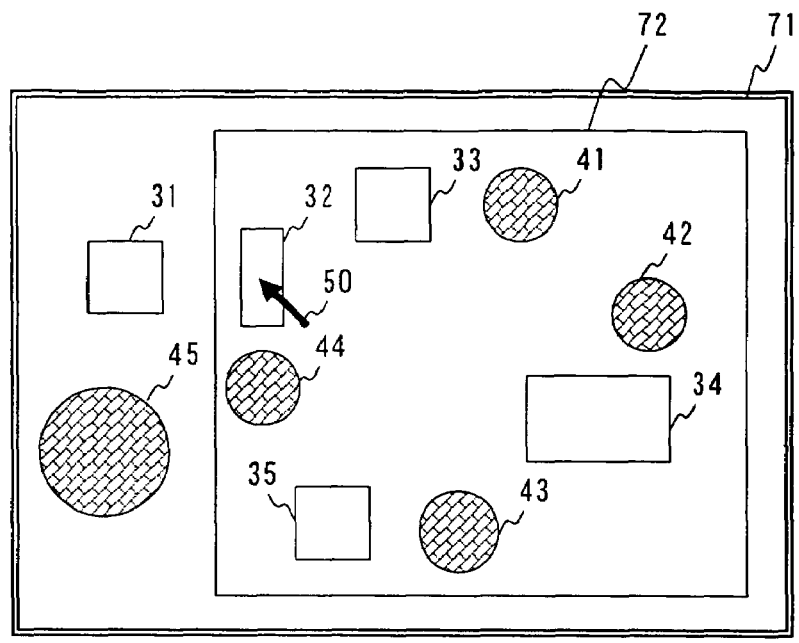
FIG. 19 is a diagram showing an example of the initial state of a mouse cursor movement that involves screen scrolling.

Next, a specific example of a mouse cursor movement that involves screen scrolling will be shown. FIG. 19 is a diagram showing an example of the initial state of a mouse cursor movement that involves screen scrolling. In the following description, the actual display range of the display screen 72 is a part of the edit area 71, as shown in FIG. 19. FIG. 19 is the same as FIG. 7 except the display range of the display screen 72 and the position of the mouse cursor 50.

Figure 20:
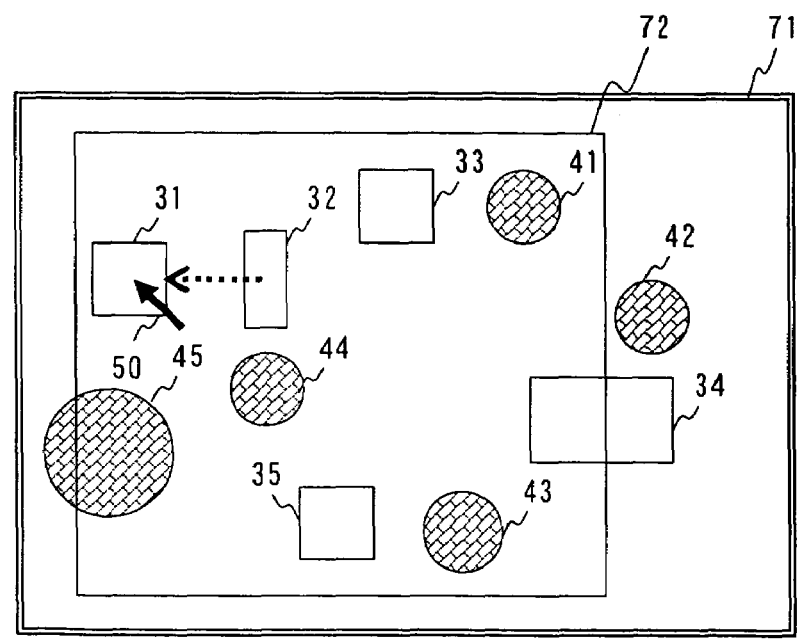
FIG. 20 is a diagram showing an example of mouse cursor movement from the state shown in FIG. 19.

At present, the mouse cursor 50 is on the rectangular object 32. In the state shown in FIG. 19, the operator enters the Shift key plus the Left arrow key as a mouse cursor moving trigger. At this time, the object designating section 5 recognizes that the rectangular object 31 is not displayed within the display screen 72. Consequently, the mouse cursor 50 is moved onto the rectangular object 31, as shown in FIG. 20, and the display range of the display screen 72 is moved so that the rectangular object 31 is displayed.

Figure 21:
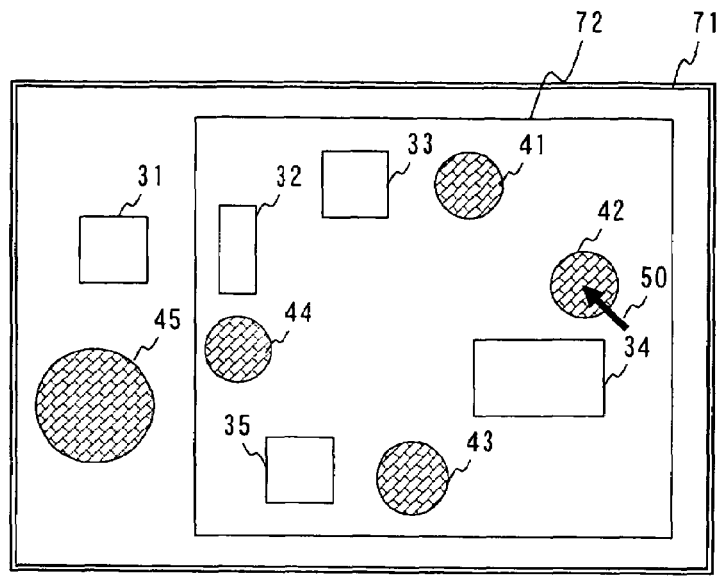
FIG. 21 is a diagram showing an example of the initial state of a mouse cursor movement at an end of an edit area.

Next, a specific example of mouse cursor movement at an end of the edit area will be shown. FIG. 21 is a diagram showing an example of the initial state of a mouse cursor movement at an edit area end. In the following description, the actual display range of the display screen 72 is a part of the edit area 71, as shown in FIG. 21. FIG. 21 is the same as FIG. 7 except the display range of the display screen 72 and the position of the mouse cursor 50.

Figure 22:
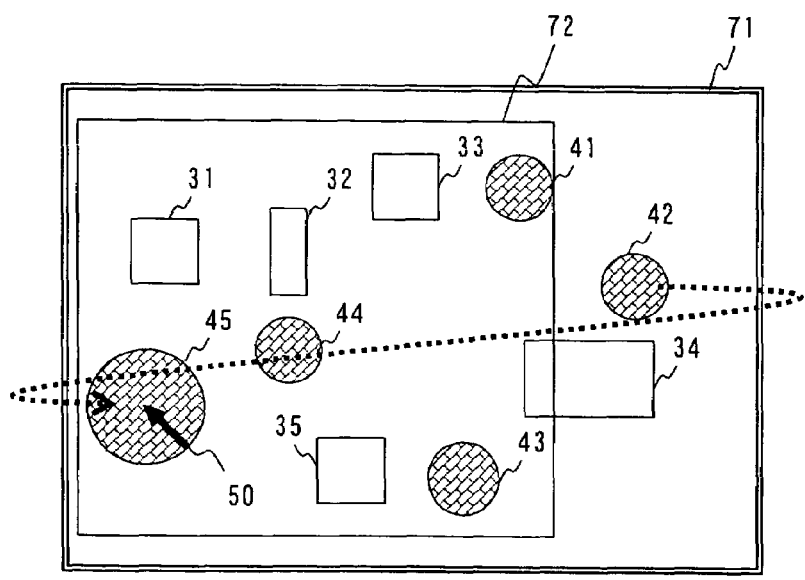
FIG. 22 is a diagram showing an example of mouse cursor movement from the state shown in FIG. 21.
Figure 23:
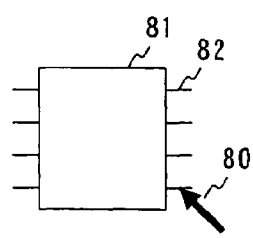
FIG. 23 is a diagram showing an example of a logic symbol and a mouse cursor.

At present, the mouse cursor 50 is on the circular object 42 at the right-hand end of the edit area 71. In the state shown in FIG. 21, the operator enters the Shift key plus the Right arrow key as a mouse cursor moving trigger. At this time, the object designating section 5 recognizes that no circular object is present at the right-hand side of circular object 42. Consequently, object designating section 5 shifts from the right-hand end to the left-hand end of the edit area 71 to search for a circular object present rightward of the left-hand end of the edit area 71. As a result, the mouse cursor 50 is moved onto the circular object 45, as shown in FIG. 22, and the display range of the display screen 72 is moved so that the circular object 45 is displayed.

Although only the horizontal screen scrolling has been described in the foregoing example, screen scrolling can also be made in the vertical direction. Thus, it is possible for the operator to perform an operation with a feeling as if the upper and lower sides and the left and right sides of the display were contiguous with each other.

Although in the foregoing embodiment the present invention has been described with regard to an example in which mouse cursor moving triggers are assigned to the Up, Down, Left and Right arrow keys, it is possible to assign mouse cursor moving triggers to other keys according to a rule file. For example, mouse cursor moving triggers may be assigned to the numeric keys to allow the mouse cursor to move in oblique directions as well. It is also possible to handle as objects widgets that constitute a display screen, such as tool bar buttons, a check button widget, and a text field widget. Mouse cursor moving triggers may be assigned to these widgets, respectively.

It should be noted that the present invention is not necessarily limited to the foregoing embodiments but can be modified in a variety of ways without departing from the gist of the present invention.

What is claimed is:

1. A graphic object designating apparatus comprising:
   an object managing section that manages object information including types and positions of objects present in an edit area of a graphics editing system and a mouse cursor position;
   a rule storage section that stores rules concerning triggers generated in response to key entries by an operator, the key entries indicating a direction in which the mouse cursor should move and designating an object;

a trigger processing section that generates a mouse cursor moving trigger that instructs a direction of movement of the mouse cursor and a type of an object that the mouse cursor should move to, and an object designating trigger that instructs designation of an object to be edited according to key entries and rules related to the key entries; and an object designating section that moves the mouse cursor on a basis of said object information and said mouse cursor moving trigger, or designates said object to be edited on a basis of said object information and said object designating trigger, the object designating section calculating an evaluation function based on a position of the mouse cursor and a position of each of objects selected as candidates for a destination of the mouse cursor when the mouse cursor moving trigger is generated, and moving the mouse cursor to an object having smallest value of said evaluation function among the candidates objects, where the evaluation function is given by $$|Mx-Ox| \times Cx + |My-Oy| \times Cy$$

where (Mx, My) is the position of the mouse cursor, (Ox, Oy) is the position of each candidate object, and Cx and Cy are weight coefficients, wherein a set of weight coefficients for a vertical direction defined as being Cx>Cy are used when the mouse cursor moving trigger instructs movement of the cursor in a vertical direction and a set of weight coefficients for a horizontal direction defined as being Cx<Cy are used when the mouse cursor moving trigger instructs movement of the cursor in a horizontal direction.

2. A graphic object designating apparatus according to claim 1, wherein types of objects to which the mouse cursor should move have also previously been assigned to said key entries in said rules;

said trigger processing section allows said mouse cursor moving trigger to include a direction in which the mouse cursor should move and a type of an object to which the mouse cursor should move; and said object designating section restricts a type of an object to be a candidate for a destination of the mouse cursor according to said mouse cursor moving trigger.

3. A graphic object designating apparatus according to claim 1, further comprising:

a rule input section that inputs a file containing said rules written in a predetermined format.

4. A graphic object designating apparatus according to claim 1, wherein said rules include said set of weight coefficients for a vertical direction and said set of weight coefficients for a horizontal direction.

5. A graphic object designating apparatus according to claim 1, wherein said object designating section moves a display range of a display screen when said mouse cursor moving trigger is generated and an object to be a candidate for a destination of the mouse cursor is outside said display screen.

6. A graphic object designating apparatus according to claim 1, wherein when said mouse cursor moving trigger is generated and there is no object to be a candidate for a destination of the mouse cursor in a direction indicated by said mouse cursor moving trigger, said object designating section judges that the mouse cursor is at an opposite side of said edit area, and makes a search for an object to be a candidate for a destination of the mouse cursor again.

7. A graphic object designating method for designating a graphic object to be edited among graphic objects present in an edit area of a graphics editing system according to a position of a mouse cursor, said method comprising:

managing object information including types and positions of objects present in said edit area and a mouse cursor position;

generating cursor moving trigger that instructs a direction of movement of the mouse cursor and a type of an object that the mouse cursor should move to, and an object designating trigger that instructs designation of an object to be edited according to key entries and rules concerning trigger, the trigger being generated in response to the key entries; and moving the mouse cursor on a basis of said object information and said mouse cursor moving trigger, or designating said object to be edited on a basis of said object information and said object designating trigger, the moving calculating an evaluation function based on a position of the mouse cursor and a position of each of objects selected as candidates for a destination of the mouse cursor when the mouse cursor moving trigger is generated, and moving the mouse cursor to an object having a smallest values of said evaluation function among the candidates objects, where the evaluation function is given by $$|Mx-Ox| \times Cx + |My-Oy| \times Cy$$

where (Mx, My) is the position of the mouse cursor, (Ox, Oy) is the position of each candidate object, and Cx and Cy are weight coefficients, wherein a set of weight coefficients for a vertical direction defined as being Cx>Cy are used when the mouse cursor moving trigger instructs movement of the cursor in a vertical direction and a set of weight coefficients for a horizontal direction defined as being Cx<Cy are used when the mouse cursor moving trigger instructs movement of the cursor in a horizontal direction.

8. A computer-readable storage medium that stores graphic object designating program to instruct a computer to execute a graphic object designating method for designating a graphic object to be edited among graphic objects present in an edit area of a graphics editing system according to a position of a mouse cursor, the graphic object designating program instructing the computer to execute an operation:

managing object information including types and positions of objects present in said edit area and a mouse cursor position;

generating a mouse cursor moving trigger that instructs a direction of movement of the mouse cursor and a type of an object that the mouse cursor should move to, and an object designating trigger that instructs designation of an object to be edited according to key entries and rules concerning trigger, the trigger being generated in response to the key entries; and moving the mouse cursor on a basis of said object information and said mouse cursor moving trigger, or designating said object to be edited on a basis of said object information and said object designating trigger, the moving calculating an evaluation function based on a position of the mouse cursor and a position of each of objects selected a candidates for a destination of the mouse cursor when the mouse cursor moving trigger is generated, and moving the mouse cursor to an object having a smallest value of said evaluation function among the candidates objects, where the evaluation function given by $$|Mx-Ox| \times Cx + |My-Oy| \times Cy$$

where (Mx, My) is the position of the mouse cursor, (Ox, Oy) is the position of each candidate object, and Cx and Cy are weight coefficients, wherein a set of weight coefficients for a vertical direction defined as being Cx>Cy are used when the mouse cursor moving trigger instructs movement of the cursor in a vertical direction and a set of weight coefficients for a horizontal direction defined as being Cx<Cy are used when the mouse cursor moving trigger instructs movement of the cursor in a horizontal direction.

9. A graphic object designating apparatus according to claim claim 1, wherein the key entries assigned to the mouse cursor moving trigger is defined in the rule storage section for each object type.

10. A graphic object designating apparatus according to claim claim 1, wherein the object designating section moves the mouse cursor to an object closest to a position of the mouse cursor when the mouse cursor moving trigger is generated.

11. A graphic object designating apparatus according to claim claim 1, wherein the object designating section determines whether an object is present under the mouse cursor when the object designating trigger is generated.

12. A graphic object designating apparatus for designating a graphic object to be edited among graphic objects present in an edit area of a graphics editing system according to a position of a mouse cursor, said apparatus comprising:

an object managing section that manages object information including types and positions of objects present in said edit area and a mouse cursor position;

a trigger processing section that generates a mouse cursor moving trigger that instructs movement of the mouse cursor based on key entries indicating a direction in which the mouse cursor should move; and an object designating section that moves the mouse cursor on a basis of said object information and said mouse cursor moving trigger, said object designating section calculating an evaluation function based on a position of the mouse cursor and a position of each of objects selected as candidates for a destination of the mouse cursor when the mouse cursor moving trigger is generated, and moves the mouse cursor to an object having a smallest value of said evaluation function among the candidate objects, where the evaluation function is given by $$|Mx-Ox| \times Cx + |My-Oy| \times Cy$$

where (Mx, My) is the position of the mouse cursor, (Ox, Oy) is the position of each candidate object, and Cx and Cy are weight coefficients, wherein a set of weight coefficients for a vertical direction defined as being Cx>Cy are used when the mouse cursor moving trigger instructs movement of the cursor in a vertical direction and a set of weight coefficients for a horizontal direction defined as being Cx<Cy are used when the mouse cursor moving trigger instructs movement of the cursor in a horizontal direction.

13. A graphic object designating apparatus according to claim 12, further comprising:

a rule storage section in which assignments of key entries for indicating a direction in which the mouse cursor should move have been stored as rules, wherein the trigger processing section generates the mouse cursor moving trigger according to said key entries and said rules, wherein said rules include said set of weight coefficients for a vertical direction and said set of weight coefficients for a horizontal direction.

14. A graphic object designating apparatus comprising:

an object managing section that manages object information including types and positions of objects present in an edit area of a graphics editing system;

a rule storage section that stores rules concerning triggers that is generated in response to key entries by an operator, the key entries including key entries for indicating a direction in which the mouse cursor should move and key entries for designating an object;

a trigger processing section that generates a mouse cursor moving trigger that instructs a direction of movement of the mouse cursor and a type of an object that the mouse cursor should move to according to key entries and rules related to the key entries; and an object designating section that moves the mouse cursor on a basis of said object information and said mouse cursor moving trigger, the object designating section calculating an evaluation function based on a position of the mouse cursor and a position of each of objects selected as candidates for a destination of the mouse cursor when the mouse cursor moving trigger is generated, and moving the mouse cursor to an object having a smallest value of said evaluation function among the candidates objects, where the evaluation function is given by $$|Mx-Ox| \times Cx + |My-Oy| \times Cy$$

where (Mx, My) is the position of the mouse cursor, (Ox, Oy) is the position of each candidate object, and Cx and Cy are weight coefficients, wherein a set of weight coefficients for a vertical direction defined as being Cx>Cy are used when the mouse cursor moving trigger instructs movement of the cursor in a vertical direction and a set of weight coefficients for a horizontal direction defined as being Cx<Cy are used when the mouse cursor moving trigger instructs movement of the cursor in a horizontal direction.

* * * * *

UNITED STATES PATENT AND TRADEMARK OFFICE
CERTIFICATE OF CORRECTION

PATENT NO.       : 7,676,766 B2                                             Page 1 of 1
APPLICATION NO.  : 10/888989
DATED            : March 9, 2010
INVENTOR(S)      : Takahiro Toda It is certified that error appears in the above-identified patent and that said Letters Patent is hereby corrected as shown below:

Column 13, Line 12, change "claim claim" to --claim--.

Column 13, Line 16, change "claim claim" to --claim--.

Column 13, Line 21, change "claim claim" to --claim--.

Signed and Sealed this

First Day of June, 2010

David J. Kappos
*Director of the United States Patent and Trademark Office*